May 30, 1939.  J. S. REID  2,160,108

METHOD AND APPARATUS FOR COVERING THIN WALL TUBING

Filed Oct. 26, 1936

INVENTOR.
JAMES S. REID,
BY John Harrow Leonard
his ATTORNEY.

Patented May 30, 1939

2,160,108

UNITED STATES PATENT OFFICE 2,160,108

METHOD AND APPARATUS FOR COVERING THIN WALL TUBING

James S. Reid, Shaker Heights, Ohio, assignor to Thermo-Plastics, Inc., St. Clair, Mich., a corporation of Michigan Application October 26, 1936, Serial No. 107,572

13 Claims. (Cl. 18—30)

This invention relates to a method and apparatus for covering and bonding to thin walled tubing or thin walled hollow articles, a very thin uniform layer of thermosplastic material, such as cellulose acetate material.

In the covering of such tubing or articles with thermosplastic material, it is necessary that the tubing be accurately centered within the mold cavity, and, at the same time, that the article be rendered capable of withstanding the exceeding high hydrostatic pressures occurring upon injection of the thermoplastic material into the mold cavity. The article to be coated preferably should also be heated to substantially the same temperature as the thermoplastic material.

One of the principal objects of the present invention is to support and center thin walled tubing accurately within a mold cavity while at the same time internally reinforcing the tubing or article so that it may withstand the hydrostatic injection pressures without distortion, collapse, or hydrostatic deflection.

A correlative object is to support and center the tubing in a manner such that no delay is occasioned in removing the centering and supporting structure therefrom and all dangers of sticking and binding of the supporting structure within the tubing are eliminated.

A more specific object is to support and center the tubing while concurrently heating the same from the interior so as to maintain the temperature substantially equal to that of thermoplastic coating.

Other objects and advantages will become apparent from the following specification, wherein reference is made to the drawing, in which.

Figure 1:
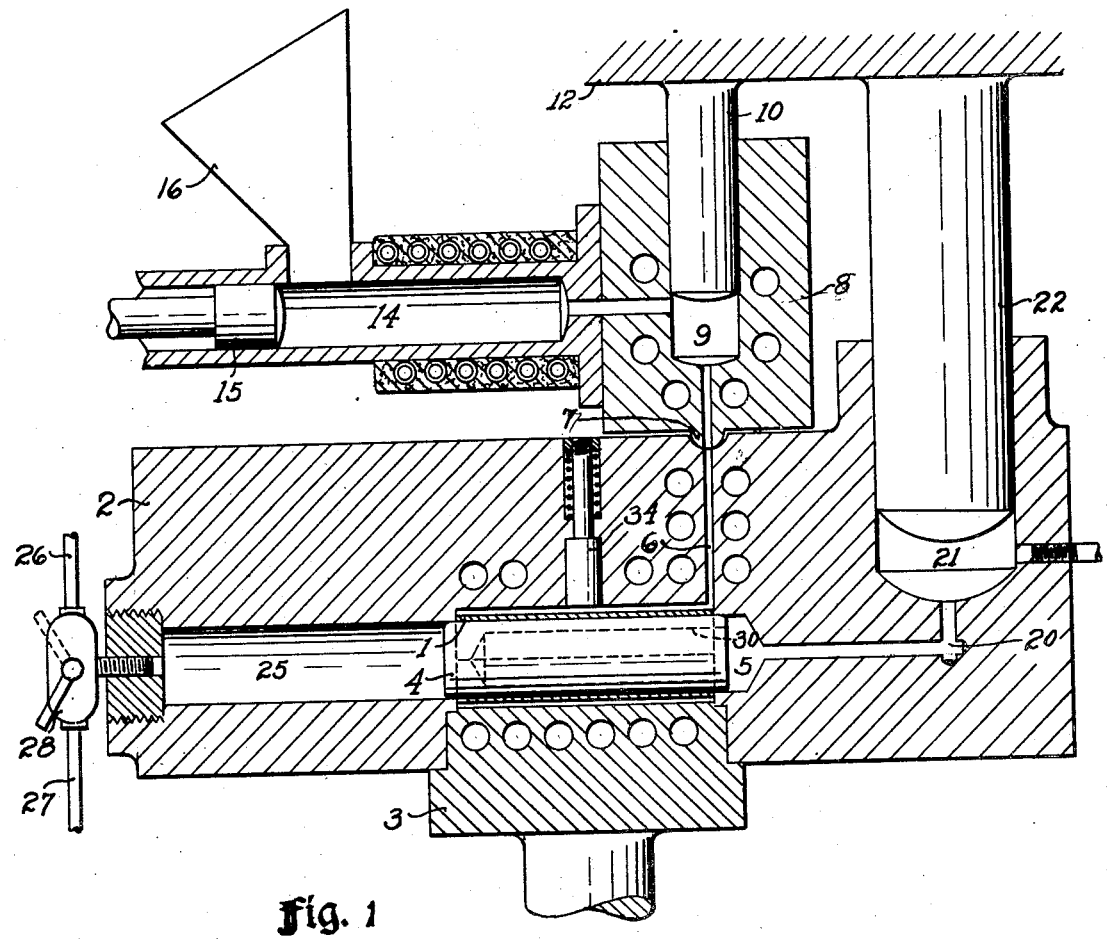
Fig. 1 is a vertical sectional view through an apparatus for practicing the method of the present invention.

For the purposes of illustration, the method will be described specifically in connection with the coating of thin wall metal tubing, its uses in connection with other articles being readily apparent therefrom. As illustrated in Fig. 1, a length of tubing 1 is placed in a mold cavity of a stationary mold block 2, the remainder of the cavity being defined by the removable mold block 3, so as to facilitate removal of the coated tubing after the coating operation.

It is necessary to support the tubing in spaced relation to the walls of the cavity and, since the coating to be applied will be extremely thin and will be applied under extremely high injection pressures, it is necessary to support the tubing in accurately spaced relation to the cavity walls and to reinforce it against radial collapse and against hydrostatic deflection. For this purpose, there is mounted in the stationary mold block 2, a reciprocable plunger 4 which is coaxial with the tubing and passes therethrough, the innermost end of the plunger passing beyond the tubing and into a suitable pressure cylinder 5 formed in the mold block 2. Leading to the mold cavity is a suitable sprue 6 which, at its outer end, receives an injection nozzle 7 for injecting the thermoplastic material into the mold cavity around the supported tubing 1. The nozzle 7 is carried on a suitable platen 8 which is mounted for movement so as to seat the nozzle firmly within the entrance of the sprue 6.

Within the platen 8 is an injection cylinder 9 which communicates through the nozzle 7 with the sprue 6 and which is provided with an injection piston 10. The platen 8 is held seated by suitable means, not shown, such as hydraulic pressure. The piston 10, in turn is carried and operated by a suitable platen 12 which upon downward movement, acts to force the molten thermoplastic material from the injection cylinder 9 through the sprue 6 and into the mold cavity.

The charge of thermoplastic material is supplied from a cylinder 14 by a suitable plunger 15 which also may be operated by hydraulic or other pressure. A hopper 16 which accommodates the dry or granular thermoplastic material is arrange to discharge into the cylinder 14 to replace the charge. The thermoplastic material is heated in the cylinder 14 and then injected into the cylinder 9, whereupon it may be injected into the mold. This injection is effected with the material heated to 250° or 300° Fahrenheit, and under relatively high pressure, so as to insure rapid flow of the material into position and proper welding of the material to the article and into a homogeneous mass.

Since, as mentioned, the clearance between the tubing 1 and the walls of the mold cavity is extremely small, and the injection must take place very rapidly, the face of the tubing exposed toward the sprue 6 is subjected to a very high instantaneous hydrostatic pressure. If the clearance is not accurately maintained at the instant of injection so as to permit the material to completely envelop the article, hydrostatic deflection of the tubing downwardly away from the sprue will occur, thus augmenting the hydrostatic unbalance on the tubing, and preventing the formation of a uniform or continuous coating. With the plunger 4 inserted in the tubing and extending beyond the ends of the tubing and into the cylinder 5, the tubing is supported and centered throughout its length. Furthermore, the plunger 4 fits snugly within the tubing and reinforces the tubing against radial collapse.

Since the clearance is accurately maintained, and the initial impact of the hydrostatic pressure does not vary the clearance, the thermoplastic material will pass entirely around the tubing at the zone of the sprue 6, immediately upon injection, and thus provide hydrostatic balance. The continued pressure of the piston 10 causes the thermoplastic material to flow axially of the tubing to the end opposite from its injection as a circumferentially continuous envelope.

It is desirable that no appreciable amount of the heat of the thermoplastic material be absorbed by the tubing, as otherwise a chilling effect would result and the proper flow and welding of the thermoplastic material in a homogeneous mass would be prevented. Furthermore, if the plunger 4 were allowed to remain in the tubing until the completion of the operation, time would be lost and difficulty encountered in subsequent removal. Accordingly, means are provided for moving the plunger 4 out of the tubing as fast as the envelope of thermoplastic material travels therealong. Removal of the centering plunger 4 is possible because, if the hydrostatic balance is initially created, it will maintain itself thereafter.

For this purpose, the cylinder 5 is provided with an inlet duct 20 which, in turn, is connected with a suitable cylinder 21 into which hot water or heated pressure fluid may be supplied at the temperature of the thermoplastic material. Operating within the cylinder 21 is a hydraulic piston 22, the piston 22, in turn, being operated directly by the platen 12, which, as stated before, actuates the injection piston 10. In this manner both the injection piston 10 and the hydraulic piston 22 are forced in unison and concurrently into their respective cylinders. With both pistons operating from the same platen a definite ratio of volumetric displacement of the two pistons is maintained. Thus, concurrently with the injection of the thermoplastic material, the heated fluid is injected into the cylinder 5 and forces the plunger 4 out of the tubing. The inner or trailing end of the outgoing plunger preferably lags slightly with respect to the leading limit of the advancing thermoplastic envelope, so that the reinforcement is not removed in advance thereof.

Instead of a positive piston 22, steam or other pressure fluid may be admitted into the cylinder 5 from any desired source of pressure.

In order to maintain an adequate hydraulic reinforcing or balancing pressure within the tube as the plunger 4 is being withdraw, a hydraulic resistance is provided which acts against the opposite end of the plunger 4, during its withdrawal. This pressure is maintained through the medium of a hydraulic cylinder 25 which receives the plunger 4, the cylinder 25 being connected with an inlet conduit 26 and a bleeder conduit 27. A valve 28 is interposed between the conduits and cylinder 25 and so arranged that when the valve is moved into one position, the hydraulic fluid is admitted to the cylinder 25 for returning the plunger 4 to its original position within the tubing. When the valve is in the opposite direction, it disconnects the inlet conduit 26 from the cylinder and connects the cylinder to the small bleeder 27 so that the movement of the plunger 4 by the fluid pressure in the cylinder 5 is yieldably resisted. The amount of resistance offered may be controlled, within certain limits, by the amount of the opening to the bleeder duct exposed by the valve.

When the cavity surrounding the tubing 1 has been completely filled with the thermoplastic material the external pressure tending to collapse the tubing is accordingly increased. This external pressure must concurrently be counter-balanced from within the tubing by a corresponding pressure. This concurrent pressure balance on the inner and outer surfaces of the tubing may be accomplished by providing a positive stop for the plunger 4 against which it abuts at the instant that the cavity is completely filled with thermoplastic material. Continued pressure on both pistons 10 and 22 at this instant produces substantially equal pressure on both inner and outer surfaces of the tubing. Therefore, regardless of the magnitude of the injecting pressure on the outside of the tube an equal counter-balancing pressure inside the tube is produced.

As stated above, it is desirable that the plunger 4 be maintained at the same temperature, or at a greater temperature, than the thermoplastic material so as to assure proper heating of the tubing 1. For this purpose, the plunger 4 may be hollow bored part way of its length, as indicated at 30, so that the heated pressure fluid may enter thereinto. Thus, by proper correlation of the movement of the piston 10 and the plunger 4, the tubing 1 is maintained centered and hydrostatically balanced and is reinforced against radial collapse.

Upon completion of the molding operation the cavity may be suitably chilled to set the thermoplastic material. The plunger 4, at this time, is fully withdrawn from the tubing so that the mold plate 3 may be removed and the coated tubing readily lifted from the mold.

The completed tubing may be removed from the stationary mold block 2 by means of a suitable ejecting pin 34. This ejecting pin may be operated from the upper surface of the mold block 2 by a suitable drift pin and hammer.

Figure 2:
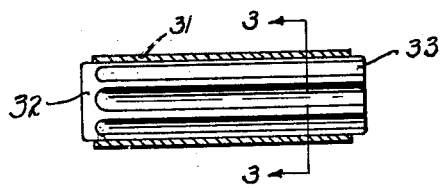
Fig. 2 is a sectional view of a length of tubing with a modified reinforcement and centering support introduced therein.
Figure 3:
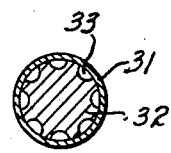
Fig. 3 is a sectional view taken on a plane indicated by the line 3—3 in Fig. 2.
Figure 4:
Fig. 4 is a side elevation of the modified reinforcement and centering support illustrated in Fig. 2.

Referring next to Figs. 2, 3, and 4, a similar structure is illustrated in which the tubing is internally reinforced substantially entirely by hydrostatic pressure while maintained centered mechanically. In this modification, the tubing 31 is supported in the mold on a plunger 32, corresponding in operating effect with the plunger 4. The surface of the plunger 32, however, is provided with a series of grooves 33 so that the heated fluid injected into the mold cylinder for moving the plunger 32 comes in direct contact with the inner wall of the tubing 31. Thus the steam or heated fluid utilized for removing the centering plunger 32 is also directly effective against the walls of the tubing for heating the same and for hydrostatically resisting radial collapse. In such an instance, the pressure of the fluid should be substantially the same as the injection pressure of the thermoplastic material.

Although a limited number of modifications embodying the present invention are disclosed it will be apparent to those skilled in the art that other modifications and adaptations of the present type of mold may be made without departing from the spirit and scope as defined in the annexed claims.

Having thus described my invention, what I claim is:

1. The method of covering thin wall hollow tubing with thermoplastic material, comprising supporting the article in a mold cavity in spaced relation to the walls thereof accurately by a movable support extending within the article, injecting fluid thermoplastic material into the cavity adjacent one end of the tubing under high pressure to cause the material to flow as an envelope lengthwise of the tubing to the opposite end, and concurrently withdrawing the support in a predetermined relation to the leading limit of the flowing material.

2. The method of covering thin wall hollow tubing with thermoplastic material, comprising supporting the article in a mold cavity in spaced relation to the walls thereof accurately by a movable support extending within the article, injecting fluid thermoplastic material into the cavity adjacent one end of the tubing under high pressure to cause the material to flow as an envelope lengthwise of the tubing to the opposite end, and concurrently withdrawing the support in a predetermined relation to the leading limit of the flowing material and supporting the tubing internally with fluid pressure progressively at the portion from which the support is withdrawn.

3. The method of covering thin wall hollow tubing with thermoplastic material, comprising supporting the article in a mold cavity in spaced relation to the walls thereof accurately by a movable support extending within the article, injecting fluid thermoplastic material into the cavity adjacent one end of the tubing under high pressure to cause the material to flow as an envelope lengthwise of the tubing to the opposite end, and concurrently withdrawing the support in slightly lagging relation to the leading limit of the flowing material.

4. An apparatus for coating and bonding to tubular stock a layer of thermoplastic material comprising separable mold sections defining a mold cavity, injection means for injecting thermoplastic material into the cavity, a reciprocable plunger extending into the cavity in position for entering axially into a length of tubular stock to be coated from one end and snugly fitting within the stock for supporting the stock in the cavity in accurately spaced relation to the wall thereof, said plunger being rigid and rigidly supported for resisting hydrostatic deflection of the stock by the injected material, and being removable axially from the stock.

5. An apparatus for coating and bonding to tubular stock a layer of thermoplastic material comprising separable mold sections defining a mold cavity, injection means for injecting thermoplastic material into the cavity, a reciprocable plunger extending into the cavity in position for entering axially into a length of tubular stock to be coated from one end and snugly fitting within the stock and extending beyond the opposite end of the stock, a cavity in one of the mold sections receiving and snugly accommodating the extending portion of the plunger for supporting the stock in the cavity in accurately spaced relation to the wall thereof, said plunger being rigid and rigidly supported for resisting hydrostatic deflection of the stock by the injected material, and being removable axially from the stock.

6. An apparatus for coating and bonding to tubular stock a layer of thermoplastic material comprising separable mold sections defining a mold cavity, injection means for injecting thermoplastic material into the cavity, a reciprocable plunger extending into the cavity in position for entering axially into a length of tubular stock to be coated from one end and snugly fitting within the stock and extending beyond the opposite end of the stock, a cavity in one of the mold sections receiving and snugly accommodating the extending portion of the plunger for supporting the stock in the cavity in accurately spaced relation to the wall thereof, said plunger being rigid and rigidly supported for resisting hydrostatic deflection of the stock by the injected material, and means for supplying fluid pressure into said cavity to retract the plunger from within the stock.

7. An apparatus for coating and bonding to tubular stock a layer of thermoplastic material comprising separable mold sections defining a mold cavity, injection means for injecting thermoplastic material into the cavity, a reciprocable plunger extending into the cavity in position for entering axially into a length of tubular stock to be coated from one end and snugly fitting within the stock and extending beyond the opposite end of the stock, a cavity in one of the mold sections receiving and snugly accommodating the extending portion of the plunger for supporting the stock in the cavity in accurately spaced relation to the wall thereof, said plunger being rigid and rigidly supported for resisting hydrostatic deflection of the stock by the injected material, means for supplying fluid pressure into said cavity to retract the plunger from within the stock, and means for operating the injection means and last mentioned means in a predetermined relation to each other.

8. An apparatus for coating and bonding to tubular stock a layer of thermoplastic material, comprising mold means having a cavity accommodating a length of tubular stock to be coated, injection means for injecting fluid thermoplastic material into the cavity at high pressure, a plunger extending into the cavity axially of the length of stock and snugly fitting within the stock for supporting the same within the cavity in accurately spaced relation to the wall of the cavity, said plunger having a stock engaging surface providing for access of fluid to the interior wall of the stock while the plunger is accommodated within the stock, and means for injecting fluid under pressure within the stock.

9. An apparatus for coating and bonding to tubular stock a layer of thermoplastic material, comprising mold means having a cavity accommodating a length of tubular stock to be coated, injection means for injecting fluid thermoplastic material into the cavity at high pressure, a reciprocable plunger movable axially of the stock and thereinto while the stock is in the cavity, and snugly fitting within the stock for supporting the same within the cavity in accurately spaced relation to the cavity wall, and means for heating the plunger.

10. An apparatus for coating and bonding to tubular stock a layer of thermoplastic material, comprising mold means having a cavity accommodating a length of tubular stock to be coated, injection means for injecting fluid thermoplastic material into the cavity at high pressure, a reciprocable plunger movable axially of the stock and thereinto while the stock is in the cavity, and snugly fitting within the stock for supporting the same within the cavity in accurately spaced relation to the cavity wall, a pressure cylinder within the mold means receiving and fitting an end portion of the plunger, means to introduce heated fluid under pressure into the cylinder for retracting the plunger, and said plunger having a cavity affording entrance of the heated fluid into the plunger for heating the same.

11. An apparatus for coating and bonding to tubular stock a layer of thermoplastic material comprising separable mold sections defining a mold cavity, injection means for injecting thermoplastic material into the cavity, a reciprocable plunger extending into the cavity in position for entering axially into a length of tubular stock to be coated from one end and snugly fitting within the stock and extending beyond the opposite end of the stock, a cavity in one of the mold sections receiving and snugly accommodating the extending portion of the plunger for supporting the stock in the cavity in accurately spaced relation to the wall thereof, said plunger being rigid and rigidly supported for resisting hydrostatic deflection of the stock by the injected material, and means for supplying fluid pressure into said cavity to retract the plunger from within the stock, and means yieldably resisting movement of the plunger by the fluid pressure.

12. The method of covering thin wall hollow tubing with thermoplastic material comprising supporting the tubing in a mold cavity in spaced relation to the walls thereof by a movable support extending within the tubing, injecting fluid thermoplastic material into the cavity under high pressure to cause the material to progressively envelop the tubing, concurrently withdrawing the movable support in relation to the enveloping of the article while substituting therefor fluid under high pressure for reinforcing the article against collapse.

13. An apparatus for coating stock with a layer of thermoplastic material comprising separable mold sections defining a mold cavity, means for injecting fluid thermoplastic material into the cavity, a retractable member movable relative to the stock to be coated for supporting it in the cavity in spaced relation to the wall thereof and for internally resisting distortion of the stock by the fluid injected thermoplastic material enveloping the stock, and means supplying fluid pressure for supporting the stock internally as the retractable member is withdrawn from the stock.

JAMES S. REID.